(12) United States Patent
Seguin (10) Patent No.: US 9,959,268 B2
(45) Date of Patent: May 1, 2018

(54) SEMANTIC MODELING OF GEOGRAPHIC INFORMATION IN BUSINESS INTELLIGENCE

(71) Applicant: Environmental Systems Research Institute, Inc., Redlands, CA (US)

(72) Inventor: Pierre Seguin, Ottawa (CA)

(73) Assignee: ENVIRONMENTAL SYSTEMS RESEARCH INSTITUTE, INC., Redlands, CA (US)

( * ) Notice: Subject to any disclaimer, the term of this patent is extended or adjusted under 35 U.S.C. 154(b) by 232 days.

(21) Appl. No.: 14/956,147

(22) Filed: Dec. 1, 2015

(65) Prior Publication Data

US 2016/0154781 A1   Jun. 2, 2016

Related U.S. Application Data (60) Provisional application No. 62/086,145, filed on Dec. 1, 2014.

(51) Int. Cl.
  *G06F 13/00* (2006.01)
  *G06F 15/00* (2006.01)
  *G06F 17/24* (2006.01)
  *G06Q 10/06* (2012.01)

(52) U.S. Cl.
  CPC .......... *G06F 17/248* (2013.01); *G06Q 10/067* (2013.01)

(58) Field of Classification Search
  CPC .............. G06Q 30/0205; G06F 17/30241
  USPC .............. 715/851, 853, 741, 780, 744
  See application file for complete search history.

(56) References Cited

U.S. PATENT DOCUMENTS

| | | | |
|---|---|---|---|
| 2011/0161137 A1* | 6/2011 | Ubalde | G06F 17/30241 705/7.34 |
| 2015/0186910 A1* | 7/2015 | Cruickshank | G06Q 30/0205 705/7.34 |

* cited by examiner

*Primary Examiner* — Kevin Nguyen (57) ABSTRACT

In some embodiments, a method includes receiving a template identifying a format for presenting geographic information, receiving an input corresponding to business intelligence (BI) data, and extracting geographical information from the input, the geographical information associated with the BI data. The method further includes accessing a geodatabase and identifying a type of the geographical information associated with the BI data, adapting the geographical information to conform to the format identified in the template, and displaying the BI data in a geospatial context based on the geographical data. The BI data can be organized in one or more semantic data models. The geographical information can include one or more location types, where each location definition may be associated with a prioritization value.

20 Claims, 9 Drawing Sheets

SEMANTIC MODELING OF GEOGRAPHIC INFORMATION IN BUSINESS INTELLIGENCE

RELATED APPLICATIONS

This application claims priority to provisional application No. 62/086,145 filed Dec. 1, 2014.

BACKGROUND

Businesses are increasingly looking for ways to gain a competitive advantage and to be able to do more with less. Business intelligence ("BI") has been a significant component to achieve these goals through leveraging corporate data and strategically equipping workers with insights that help organizations to focus on what's important and to make sound business decisions to drive performance.

Geographic Information Systems ("GIS") are systems that integrate software and data to capture, manage, analyze, and display all forms of geographically referenced information. GIS allows users to view, understand, question, interpret, and visualize data in ways that reveal relationships, patterns, and trends in the form of maps, globes, reports, and charts.

The majority of business data contains some sort of location information: office locales, customer addresses, sales territories, marketing areas, facilities, and so on. When the technologies of BI and GIS are fused together, organizations can visualize and analyze key business data through "smart" maps to discover patterns and trends that would have been easily overlooked with traditional BI tables and charts. For example, ESRI Maps for MicroStrategy uses ESRI Location Analytics to visualize BI data on a map. The user can select the type of business location to use (e.g., zip code, city, state, etc.) to display business data (e.g., profit, number of customers, etc. in that location). The user can also determine how to render the BI data (e.g., color code states or cities, use bubbles of varying size, superimpose bar graphs, etc.) For many business users not familiar with mapping software, this requires a lot of configuration to be done to generate a report, and can be a daunting task. It would be desirable to simplify the process for a typical business user.

BRIEF SUMMARY

Embodiments of the invention relate to a computer implemented method and system comprising a process of modeling the geographic information within the semantic data/layer(s) model of business intelligence systems, automatically generating context sensitive maps based on the current data within a business intelligence dashboard/board/ad-hoc analysis and reporting, and allowing for automated (1) acceleration of the map content development, (2) for mapping to be applied across the organization in accordance with corporate standards, and (3) generation of maps in ad-hoc reporting tools.

In one embodiment, the generation of maps with BI is simplified and made more efficient and automatic. In particular, the rendering of location information is a separate module from the rendering of style information about how business date relevant to that location is presented. (1) Preselection is done of the style for how the BI will be rendered (e.g., color code states or cities, use bubbles of varying size, superimpose bar graphs, etc.). This eliminates the need for a user to determine a style and enables the maintenance of standard corporate styles. (2) The geo components of the business data are identified and matched to the geo components of the mapping software. This automates this portion of the mapping of business information, allowing a business user to simply select a category that has associated geo data (e.g., customer with associated address; product sales with associated region, etc.).

In one embodiment, the identification of the geo components includes ranking a default priority order of type of location to use (e.g., zip code, city, state, etc.).

DETAILED DESCRIPTION

The integration challenges between BI and GIS are met using location analytics ("Location Analytics"). Location Analytics augments mission-critical, enterprise business systems with content, mapping, and geographic capabilities through complementary and non-disruptive technology. Integrating anything into an environment as complex as a large enterprise BI deployment can be a daunting task. BI applications range in size and scale from small (25 to 50 users) to much larger enterprise deployments that service tens of thousands of users, running thousands of reports a day, exploring and analyzing data in hundreds or thousands of dashboards. These large BI implementations bring together heterogeneous data from multiple operational systems into a consistent view in the corporate data warehouse ("Enterprise Data Warehouse(s)"). Semantic data modelling is therefore created in order to allow knowledge users to create reports rapidly ("Semantic Data Modelling" or "Semantic Data Model(s)").

Embodiments of the invention include a tool to enhance a Semantic Data Model with geographic context. An embodiment of that tool, released by ESRI after the provisional priority date referenced above, is called Location Architect and is described at: http://doc.arcgis.com/en/maps-for-microstrategy/build-a-model/what-is-.htm Users are able to use Location Architect to assist in the generation of context sensitive maps based on the current data within a BI dashboard for reports and ad-hoc analysis. The Location Architect Tool provides benefits which include: (1) it allows acceleration of the map content development, (2) it allows for mapping to be applied across the organization in accordance with the corporate standards, and (3) it allows the generation of maps in ad-hoc reporting tools.

Table 1 below illustrates a simplified block diagram of a business intelligence software stack showing the integration of BI and GIS without having a Location Architect Tool in place, according to certain embodiments of the invention. Enterprise Data Warehouse can contain a collection of various data from multiple operational systems. A designer who understands the underlying data source(s) can create Semantic Data Modeling. The data sources can come from relational databases and/or OLAP (OnLine Analytical Processing) Servers, or the like.

TABLE 1

Report Consumption (ESRI Maps Consumer)
Report/Dashboard Generation            Ad-Hoc Reporting
(ESRI Maps Designer)
            Semantic Data Modeling
               (Location Architect)
            Enterprise Data Warehouse(s)
                  (PlaceCoder)

Within the BI system, a designer can name and classify objects by types, such as dimensions or metrics/measures, thereby creating semantic layer(s) ("Semantic Layer(s) Modeling"). The Semantic Data Models can then be published to the BI platform. The BI platform can subsequently manage many different Semantic Data Models.

The Semantic Data Modelling can allow users to (1) easily and quickly create their own reports via ad-hoc reporting ("Ad-Hoc Reporting"); or (2) generate report or dashboard ("Report/Dashboard Generation") using any suitable application, such as Esri® Maps Designer—an application that allows users to add live map content to their reports. If the latter is implemented, the Report/Dashboard Generation may produce reports for the maps consumer.

Some embodiments may use a PlaceCoder, which can be a stand-alone geocoding and data appending software that is built on any suitable geocoding locator technology (e.g., Esri® geocoding locator technology). The PlaceCoder creates and refines the Semantic Data Model. It can, e.g., geocode U.S. addresses and append latitude-longitude, Federal Information Processing Standards (FIPS) codes, and demographic and Tapestry Segmentation data to each record. Using the geocode(s) generated by the PlaceCoder, the Location Architect Tool models the geographic context within the semantic layer(s) of the BI system. Users can use this model to assist in generating context sensitive maps based on the current data within the Report/Dashboard Generation or Ad-Hoc Reporting and/or ad-hoc analysis. In some cases, ad-hoc analysis may differ from ad-hoc reporting in that ad-hoc analysis may create new ad-hoc reports and an individual ad-hoc report may be but a subset of a larger ad-hoc analysis leading to a macro ad-hoc report.

In some implementations, a Location Architect tool can model the geographic context within a semantic data model of a Business Intelligence System. Context sensitive maps can be generated based on current data within a BI dashboard/report/ad-hoc analysis. This can allow the acceleration of the development of map content, allow corporate standards for mapping to be applied across the organization, and allow the generation of maps in ad-hoc reporting tools, and the like.

Figure 1:
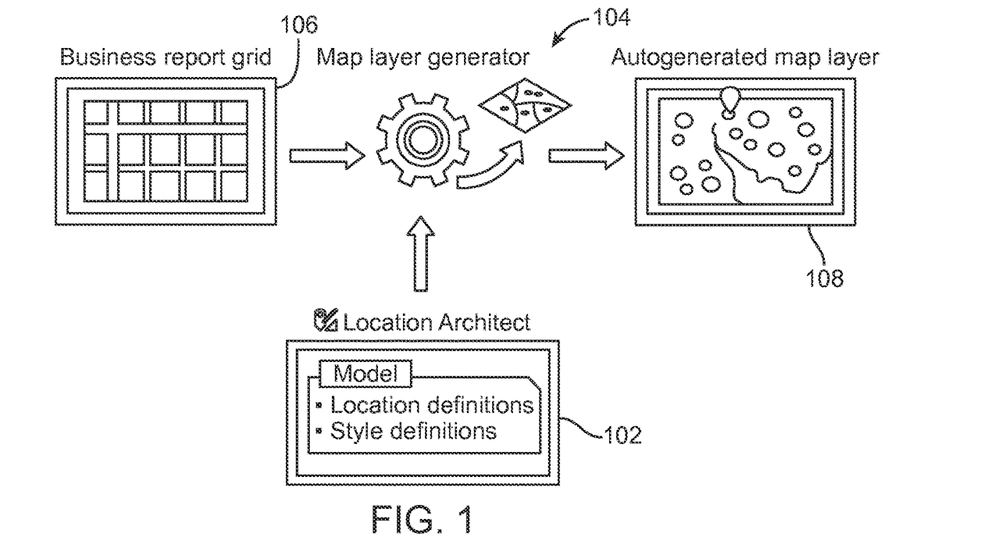
FIG. 1 illustrates a simplified block diagram of automated map generation according to certain embodiments of the invention.

FIG. 1 illustrates a simplified block diagram of automated map generation according to certain embodiments of the invention. The Location Architect tool 102 provides location definitions and style definitions to a map layer generator 104. Generator 104 also receives the business data in the form of a business report grid 106. An example of a business report grid is provided by MicroStrategy. Generator 104 then generates an auto-generated map layer 108.

In one embodiment, configuration users in an organization set up the location definitions and style definitions for use by subsequent business users in the organization. The location definitions and style definitions are added to a layer, or model, for that organization. In the cloud when business users log in with appropriate credentials, those credentials are mapped to the organization, and the layer for that organization is automatically added to the mapping program. The mapping program is used by multiple businesses, but the added layer is protected and usable only by the organization. Alternately, an instantiation of the mapping program is downloaded to internal organization computers, where the business model layer with the location and style definitions is added.

Figure 2:
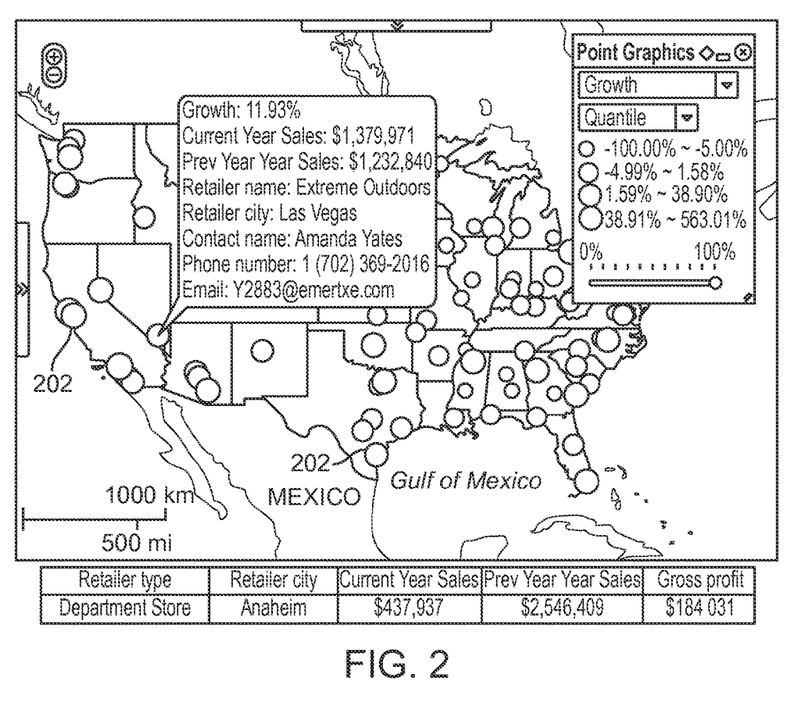
FIG. 2 illustrates an example map generated using the embodiment of FIG. 1.

FIG. 2 illustrates an example map generated using the embodiment of FIG. 1. A map of the U.S. has superimposed a series of bubbles 202 corresponding to sales growth (BI) in different cities (location). The preselected style uses bubbles, with the size of the bubble corresponding to the amount of the sales growth.

The Components of an Exemplary Location Architect Tool

In certain embodiments, a Location Architect Tool can comprise three components including: (1) geographic fields, (2) a renderer, and (3) a map generation engine. The first two components will create a Semantic Layer through their definition of the geography type and the style type respectively.

Geographic Fields

Geographic fields can be analogues to Business Intelligence 'dimensions.' For example, geographic fields can include addresses, X/Y, and custom layer definitions. Geographic fields allow the mapping of geographic relationships to fields in the semantic layer by defining a name and its type. Users can also place geographic fields in an order or priority. The order defines precedence in which matching 'layers' are chosen when multiple matches occur in the same query/table. For example, if profit data is provided by city and state, the city has a priority order and is the default chosen. The assumption is that if the data is collected to that level of granularity, it is desired to be displayed to that level. In particular, if the user has chosen data that is all for a single state, such as California, the city level data is displayed.

A business project may have attributes—for example, customer name or store name—that are not associated with location data such as addresses or longitude and latitude values. If these attributes are used in a report grid without associated location data, they cannot be displayed on a map. For example, a report may have a grid with the following columns: Customer name and Revenue. Without location values such as addresses to define where the customers are located, mapping programs will not have the necessary information to plot the customer locations on a map. With Location Architect, one can create a relationship between an attribute in the project and the necessary location data by mapping the attribute to an existing location definition in the model. When the attribute is mapped to a location definition, a location definition identifier (LDI) is created. An LDI defines a relationship between the attribute and the location fields specified in the location definition. A location definition can have more than one LDI, but each LDI should only be associated with one location definition.

In one embodiment, a configuration user at an organization does the mapping of the business data fields to the mapping program (e.g., ArcGIS) location types. This is done by creating Location Definitions that define the relationship between a business attribute or field (E.g., customer, or customer address) and the Location Definition of the mapping program (e.g., county or U.S. zip code). When the two have been associated, the Location Definition (LD) is assigned a Location Definition Identifier (LDI).

Figure 3:
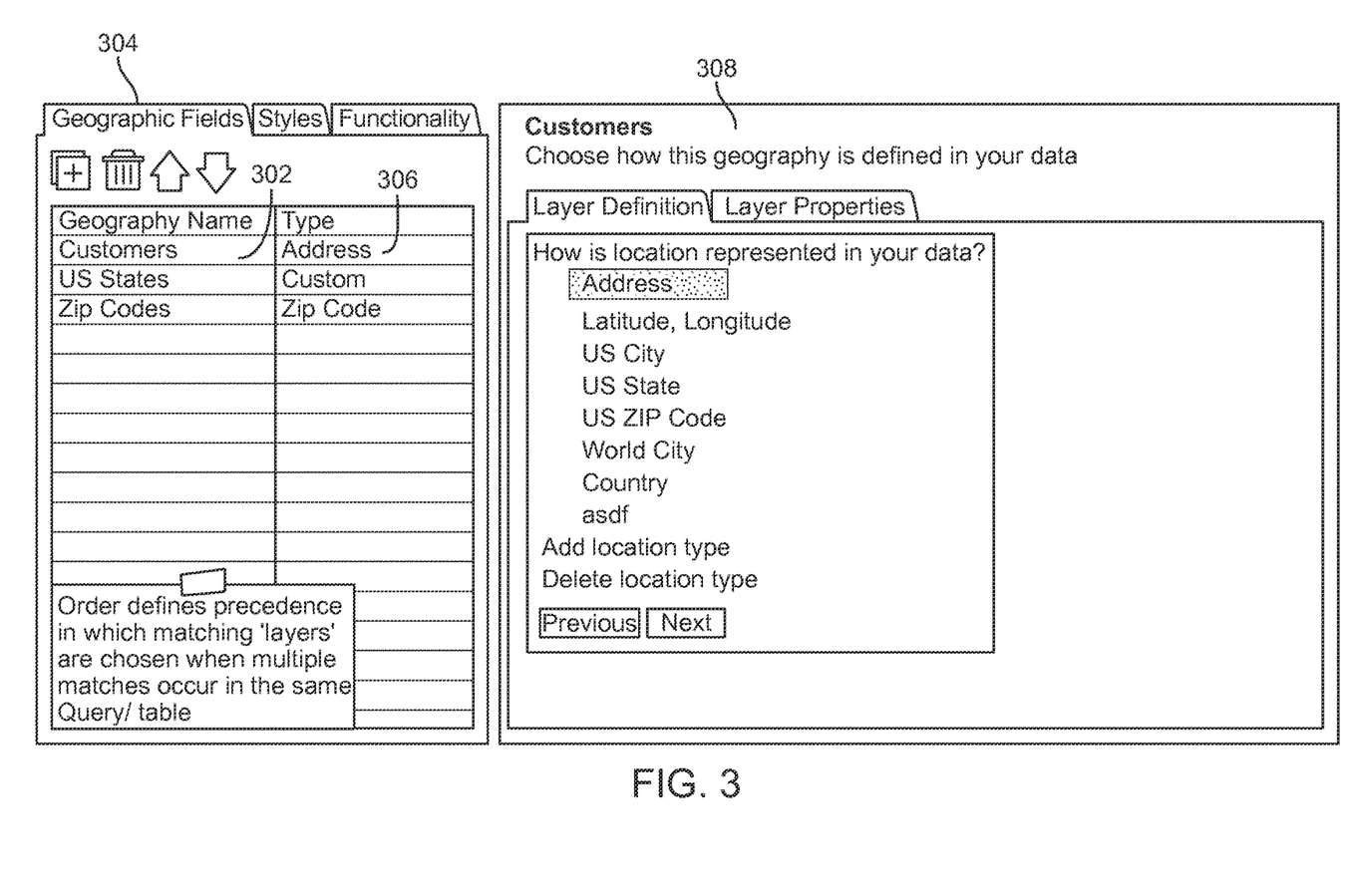
FIG. 3 shows an example of a typical screenshot of a Geographic Fields Modeler, according to certain embodiments of the invention.

FIG. 3 shows an example of a typical screenshot of a Geographic Fields Modeler, according to certain embodiments of the invention, which is used by a configuration user of an organization to setup the Location Definitions. In this example, Customers 302 is the first Geography Name listed under the Geographic Fields tab 304 with Address as its Type 306. This allows Customers to choose how the location is represented in their data. Here, "Address" was chosen from Customers pane 308. Alternately, Customers could be associated with cities, states, zip code, country, etc. depending on the type of report about customers that is desired. Similarly, a report about other entities could map locations, such as a report for vendors, warehouses, retail outlets, investors, etc.

Location Architect allows you to create relationships between attribute forms in your Business Information project and ArcGIS location types such as Address, US State, or Country. These relationships, called location definitions, are stored in your model. Location definitions are used by Esri Maps at run time to automatically generate a map layer from the data in a report.

In one embodiment, the following default location types are available if your organization is using ArcGIS Online.

Address—Depending on the geographic region of your organization, address data can be comprised of any of the following: address, neighborhood, city, subregion, region, state, province, postal code, United States Zip Code, country, and so on. The more address elements your data contains, the more accurate your results will be. The address elements can be in separate fields or they can be contained in one field (single-line address). Both methods of finding addresses are supported, but the best results are obtained by using all address elements and storing them in separate fields.

Latitude, Longitude—Latitude and Longitude values represent an X, Y coordinate location on the map. You can map X,Y coordinate data from any coordinate system. You can choose between World Geodetic Survey 1984 (WGS84) or Web Mercator, or you can specify the well-known ID of any other coordinate system. If you prefer to use WGS84 or Web Mercator, follow these guidelines: if your latitude (Y) values fall between −90 and 90 and the longitude (X) values range from −180 to 180, use WGS84; if your latitude and longitude values are in meters and have 6, 7, or 8 digits before (to the left of) the decimal point, use Web Mercator.

Standard administrative boundaries—Standard administrative boundaries include cities, states, provinces, United States Zip Codes, postal codes, and countries. The administrative boundaries available to you are determined by your locale. Cities are added to the map as points. States, provinces, postal codes, United States Zip Codes, and countries are added to the map as polygons, which represent both the shape and the location of the place.

If none of the default location types represent your data, you can specify a dynamic map service or a feature service from ArcGIS to use as a location type. For example, if your organization has its own boundaries (water districts, sales districts, or zoning boundaries), you can map your data using those locations instead of the default location types as long as there is a one-to-one relationship between the rows in your business data and the shapes in the service used as a location type.

Renderer—Styles

The renderer styles are analogous to Business Intelligence 'metrics.' It can allow a semantic layer modeler to define the default style of metrics/measures and attributes within the semantic layer.

Figure 4:
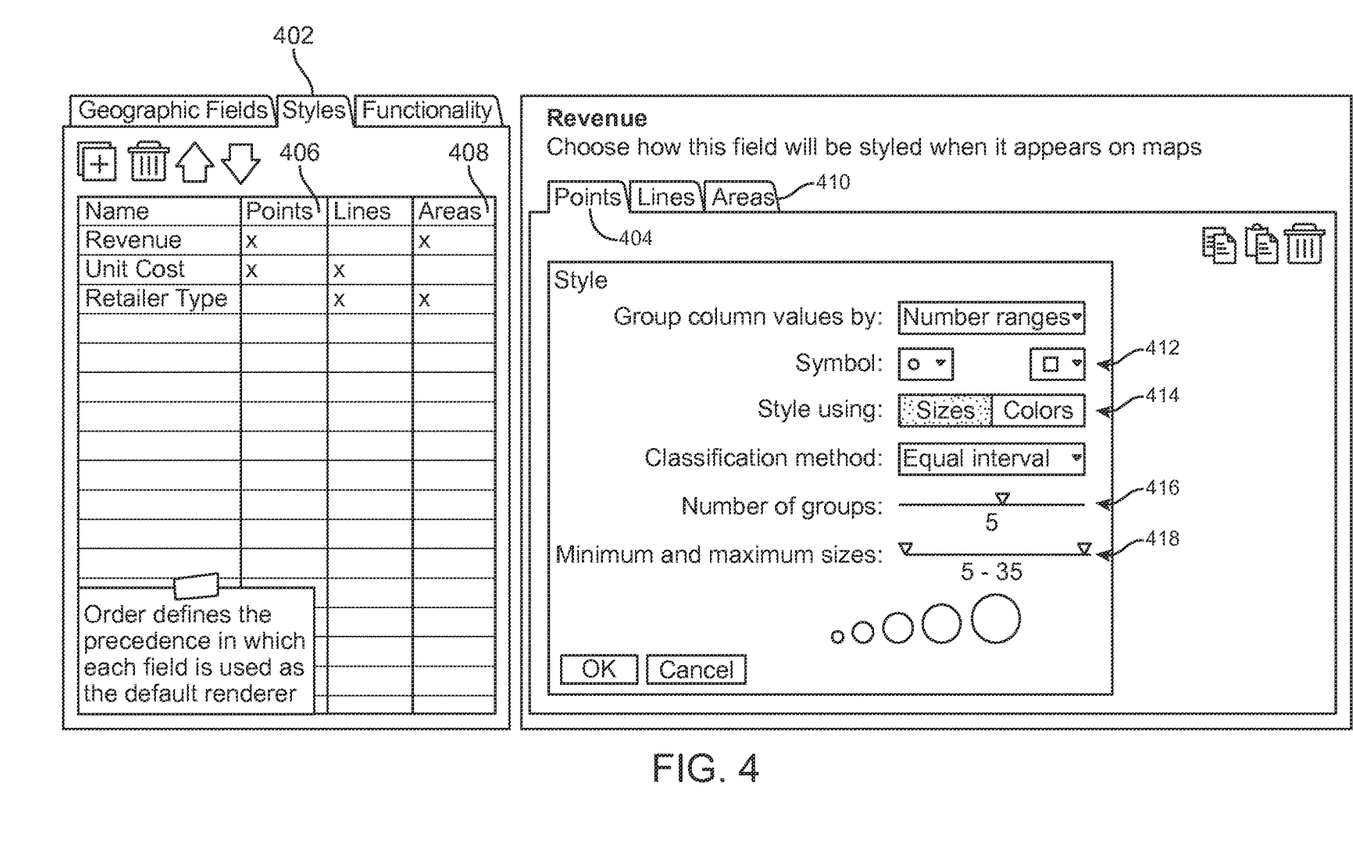
FIG. 4 shows an example of a typical screenshot of a Renderer Modeler, according to certain embodiments of the invention.

FIG. 4 shows an example of a typical screenshot of a Renderer Modeler, according to certain embodiments of the invention. For example, under a "Styles" tab 402, a business modeling user can set up the options for users in that business. As shown, "revenue" has been selected, pulling up a revenue style pane 404. The modeler has checked both points 406 and area 408, so that users can choose to represent revenue with either points or area. The modeler then determines how points will be shown on pane 404, and thereafter can select area pane 410 to set forth the style if a user wishes to use area instead for a particular presentation. A number of exemplary options are shown. The modeler can select a symbol 412, such as a circle or a square, to represent the revenue. The modeler can select a style map 414 to, for example, represent the amount of revenue by the size of the circle or square, or by its color. A "number of groups" setting 416 allows the designation of how many different sized bubbles will be used, or how many different colors, etc. A "minimum and maximum sizes" setting 418 allows the designation of the size of the smallest and largest bubbles.

A user is able to place the styles in order. Order defines the precedence in which each field is used on the default renderer. The users are able to create an entry and customize how the field will be styled when it appears on maps. The combination between the geography type from the geographic fields and the style type from the renderer creates the data model of the geography semantic layer, as represented in FIG. 5.

Figure 5:
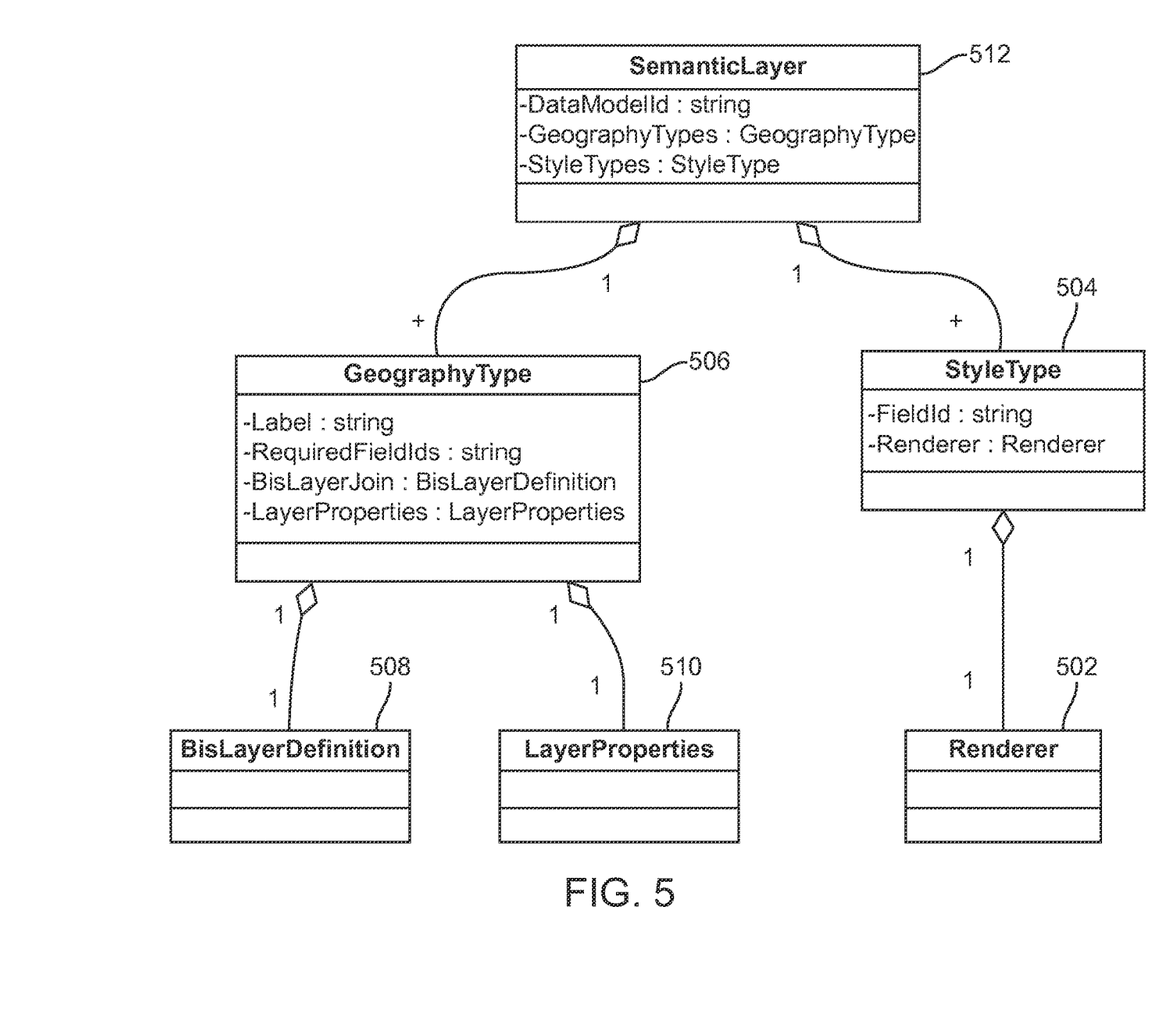
FIG. 5 illustrates a geography semantic layer data model created by the combination between a geography type from a geographic field and a style type from a renderer, according to certain embodiments of the invention.

FIG. 5 illustrates a geography semantic layer data model created by the combination between a geography type from a geographic field and a style type from a renderer, according to certain embodiments of the invention. The renderer 502 provides the style type 504. A geography type 506 is formed from the business layer definition 508 and layer properties 510. Together, the geography type 506 and style type 504 form the semantic layer data 512.

Map Generation Engine

Figure 6:
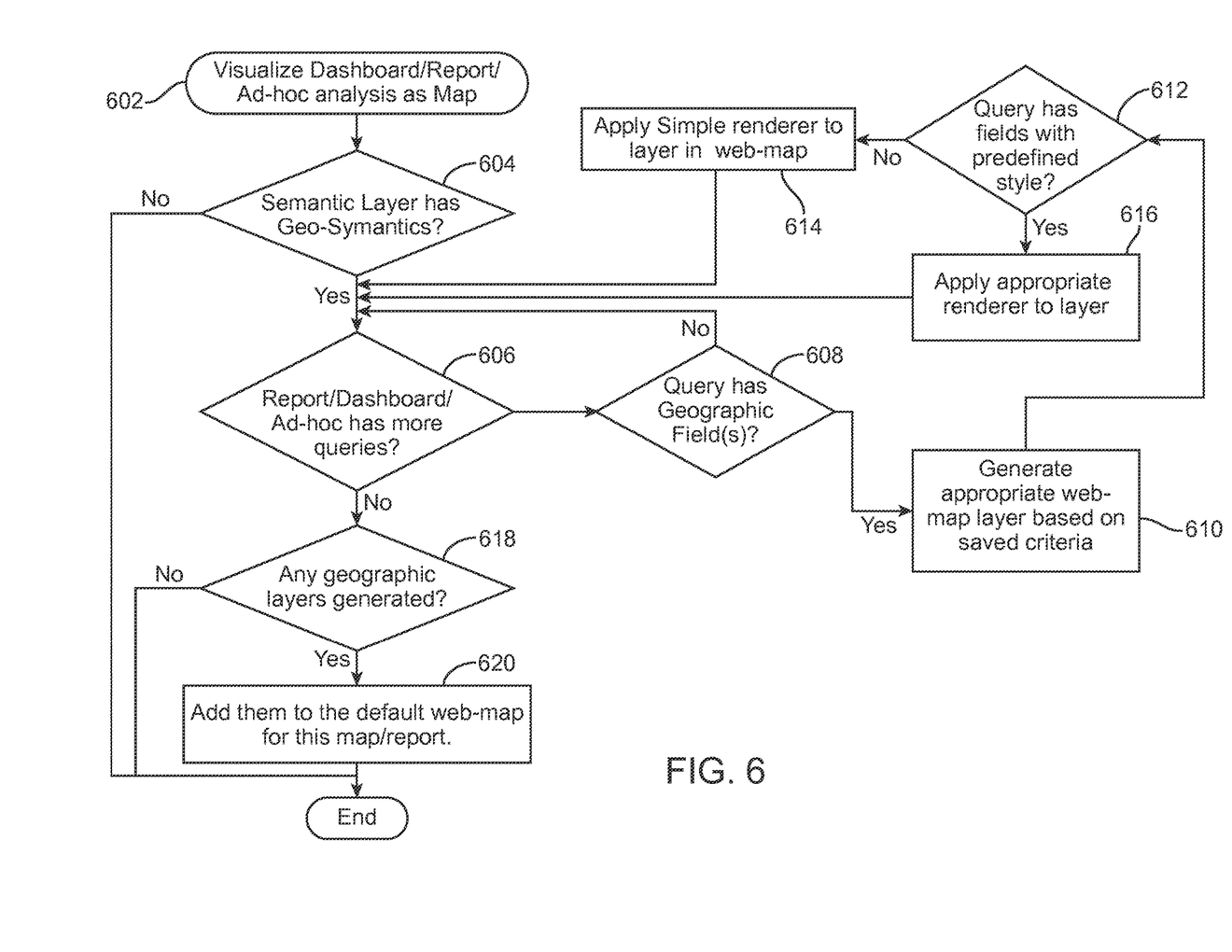
FIG. 6 illustrates how a Location Architect tool can be used to create web-map layer based on criteria defined in geographic fields and a renderer, according to certain embodiments of the invention.

When a semantic layer employs the Location Architect Tool, the map generation engine can allow a user to generate appropriate web-map layer based on the criteria defined in the geographic fields and renderer, as shown in the flowchart of FIG. 6.

FIG. 6 illustrates how a Geo-Semantic tool can be used to create web-map layer based on criteria defined in geographic fields and a renderer, according to certain embodiments of the invention. First, a user elects to visualize a report or analysis as a map (step 602). If the semantic layer doesn't have geo-semantics (604), the process can't go forward, and ends. A determination is made whether all the queries have been addressed (606), which they will not have been the first time through. If the query has geographic fields (608), the process continues. An appropriate web-map layer is generated based on saved criteria (610). If the query does not have predefined styles (612), a simple renderer is used (614). Otherwise, the appropriate renderer according to this invention is applied (616). After all the queries have been dealt with (606), if no geographic layers are generated (618), the process ends. If there are geographic layers, those are added to the default web-map for the map/report.

Sample Embodiments of System Architectures

Figure 7:
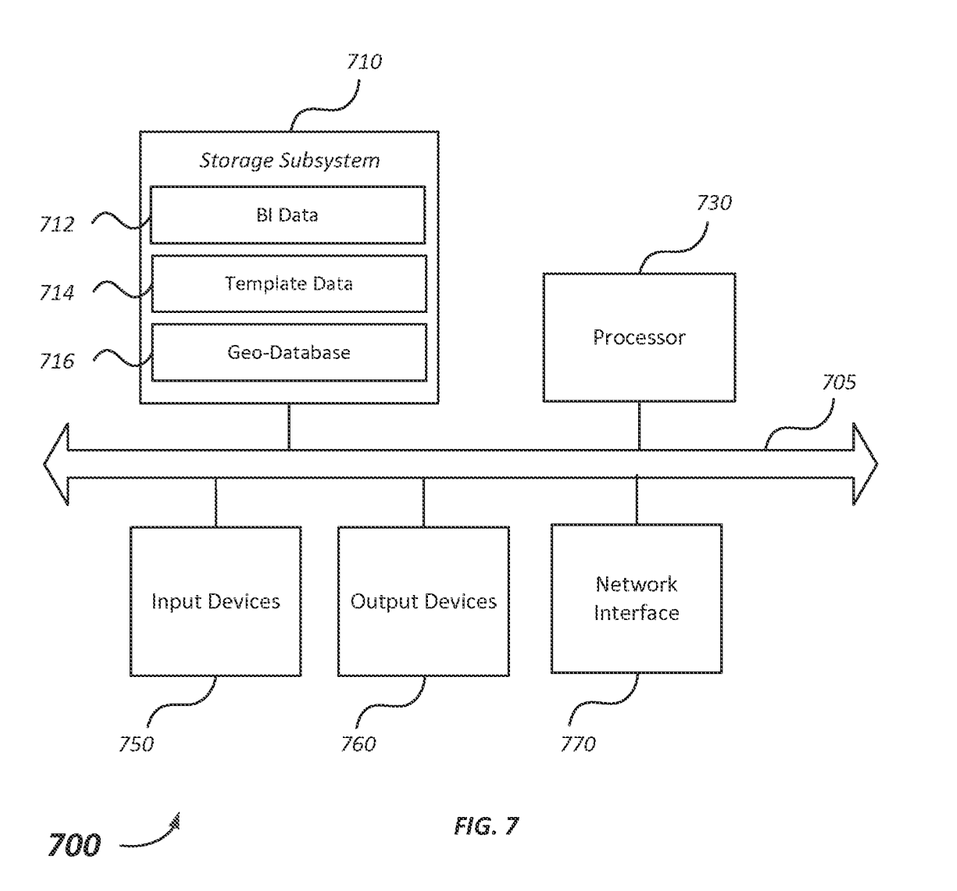
FIG. 7 illustrates a computer system for performing semantic modeling of geographic information in business intelligence, according to certain embodiments of the invention.

FIG. 7 illustrates a computer system 700 for performing semantic modeling of geographic information in business intelligence, according to certain embodiments of the invention. The processing, algorithms, and methods described herein (e.g., FIGS. 1-6) can be implemented within a computer system (or a plurality of computer systems) such as computer system 700 shown here. Computer system 700 can be implemented as any of various computing devices, including, e.g., server(s), a desktop or laptop computer, tablet computer, smart phone, personal digital assistant (PDA), or any other type of computing device, not limited to any particular form factor. Computer system 700 can include processing unit(s) 730, storage subsystem 710, input devices 750 (e.g., keyboards, mice, touchscreens, etc.), output devices 760 (e.g., displays, speakers, tactile output devices, etc.), network interface 770 (e.g., RF, 4G, EDGE, WiFi, GPS, Ethernet, etc.), and bus 705 to communicatively couple the various elements of system 700 to one another.

Processing unit(s) 730 can include a single processor, multi-core processor, or multiple processors and may execute instructions in hardware, firmware, or software, such as instructions stored in storage subsystem 710. The storage subsystem 710 can include various memory units such as a system memory, a read only memory (ROM), and permanent storage device(s) (e.g., magnetic, solid state, or optical media, flash memory, etc.). The ROM can store static data and instructions required by processing unit(s) 730 and other modules of the system 700. The system memory can store some or all of the instructions and data that the processor needs at runtime.

In some embodiments, storage subsystem 710 can store one or more of data or software programs to be executed or controlled by processing unit(s) 730, such as BI data 712, Template Data 714, or Geo-Database Data 716. Other storage subsystems can be used, combined, or the like. As mentioned, "software" can refer to sequences of instructions that, when executed by processing unit(s) 730, cause computer system 700 to perform certain operations of the software programs. The instructions can be stored as firmware residing in read only memory and/or applications stored in media storage that can be read into memory for processing by processing unit(s) 730. Software can be implemented as a single program or a collection of separate programs and can be stored in non-volatile storage and copied in whole or in part to volatile working memory during program execution. From storage subsystem 710, processing unit(s) 730 can retrieve program instructions to execute in order to execute various operations (e.g., interpolations) described herein.

It will be appreciated that computer system 700 is illustrative and that variations and modifications are possible. Computer system 700 can have other capabilities not specifically described here in detail (e.g., GIS/BI technologies). Further, while computer system 700 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 8:
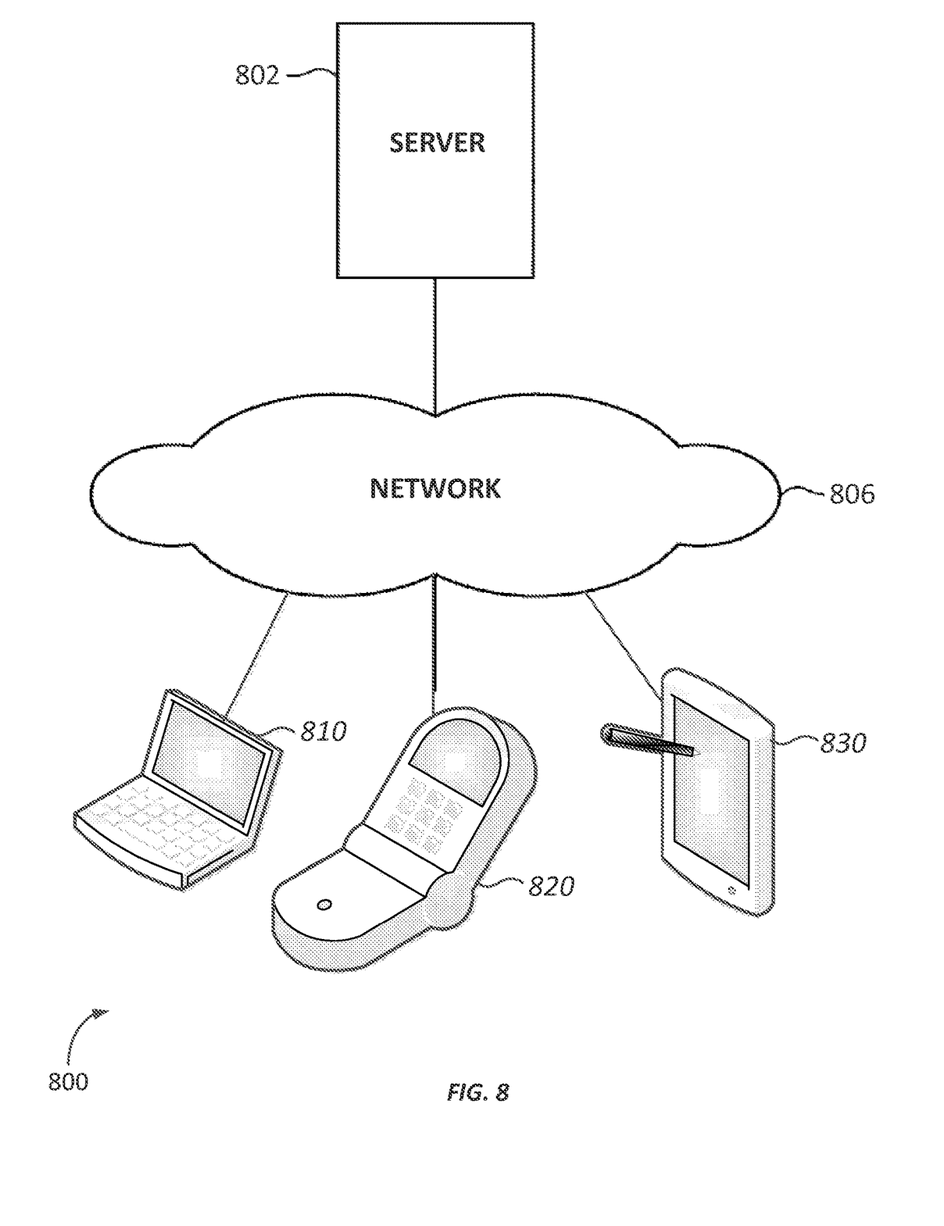
FIG. 8 depicts a simplified diagram of a distributed system for providing a system and method for performing semantic modeling of geographic information in business intelligence, according to an embodiment of the invention.

Aspects of system 700 may be implemented in many different configurations. In some embodiments, system 700 may be configured as a distributed system where one or more components of system 700 are distributed over one or more networks in the cloud. FIG. 8 depicts a simplified diagram of a distributed system 800 for providing a system and method for performing semantic modeling of geographic information in business intelligence, according to an embodiment of the invention. In the embodiment depicted in FIG. 8, system 800 is provided on a server 802 that is communicatively coupled with one or more remote client devices 810, 820, 830 via network 806.

Network 806 may include one or more communication networks, which could be the Internet, a local area network (LAN), a wide area network (WAN), a wireless or wired network, an Intranet, a private network, a public network, a switched network, or any other suitable communication network or combination thereof. Network 806 may include many interconnected systems and communication links including but not restricted to hardwire links, optical links, satellite or other wireless communications links, wave propagation links, or any communication protocol. Various communication protocols may be used to facilitate communication of information via network 806, including but not restricted to TCP/IP, HTTP protocols, extensible markup language (XML), wireless application protocol (WAP), protocols under development by industry standard organizations, vendor-specific protocols, customized protocols, and others as would be appreciated by one of ordinary skill in the art. In the configuration depicted in FIG. 8, aspects of system 800 may be displayed on any of client devices 810, 820, 830.

In the configuration depicted in FIG. 8, system 800 is remotely located from client devices 810, 820, 830. In some embodiments, server 802 may perform the methods of determining (or interpolating) a population over a geographic area described herein. In some embodiments, the services provided by server 802 may be offered as web-based or cloud services or under a Software as a Service (SaaS) model, as would be appreciated by one of ordinary skill in the art.

The various methods and embodiments described herein (e.g., the embodiments shown in FIGS. 1-6) can be implemented in a system architecture, including aspects of those shown in FIGS. 7-8. The various methods and embodiments described above can be a computer-program product tangibly embodied in a non-transitory computer-readable storage medium, including instructions configured to cause a data processing system to perform said methods and embodiments. Any combination of the various embodiments described throughout this document are possible, as would be appreciated by one of ordinary skill in the art with the benefit of this disclosure.

Blender: Prioritization

You can create location definitions for all attribute forms in your Business Information project that could be displayed on a map. Once you have created several location definitions in your model, you can set their priority order. The priority order you specify determines which location definition will be rendered as a layer on the map when your grid data matches multiple location definitions in the model.

For example, suppose a report grid contains rows of addresses with the column fields Cust address, Cust city, Cust state, Cust zip, and Cust country, and the model contains the following location definitions in the order shown:

TABLE 2

| Name | Location type | Fields |
| --- | --- | --- |
| Addresses | Address | Cust address, Cust city, Cust state, Cust zip |
| Cities | US City | Cust city, Cust state |
| States | US State | Cust state |
| Countries | Country | Cust country |

When rendering a map using this grid and the model, the fields in the grid are compared to the fields in the model's location definitions to find one or more matching location definitions. A location definition is found to be matching when all of its fields are in the grid. In the scenario where a customer is identified by address, city, state and country, all four location definitions are matches as all fields for each location definition are in the grid. Because multiple matches are found, the matching location definition with the highest priority (closest to the top of the table) is chosen to be rendered as a layer on the map. In this case, because the Addresses location definition has the highest priority, a layer showing addresses will be drawn on the map.

When setting the priority of location definitions in your model, it is important to consider how the attribute data in each location definition relates to the location definition chosen. Consider the previous example, in which the Addresses location definition has the highest priority in the model. The attribute forms in this location definition are addresses stored as rows in the Business Information project. The attribute fields are mapped to the Address location type, which defines addresses as point features. Each row of address data is mapped to one address feature (a one-to-one relationship). Therefore, each address row will be rendered as a point feature in the generated layer.

Now suppose that the States location definition was at the top of the table instead of the Addresses location definition, giving the States location definition the highest priority. Because this location definition is based on the US States location definition and the report grid contains multiple rows of addresses for each state (a many-to-one relationship), a layer created from this grid would display multiple state features corresponding to the number of individual address rows associated with each state. This would not be an appropriate representation of the current grid.

In the same way, the Cities location definition must have a higher priority than States, and States must be higher than Countries, to ensure that grid data is rendered correctly as a layer on the map.

Figure 9:
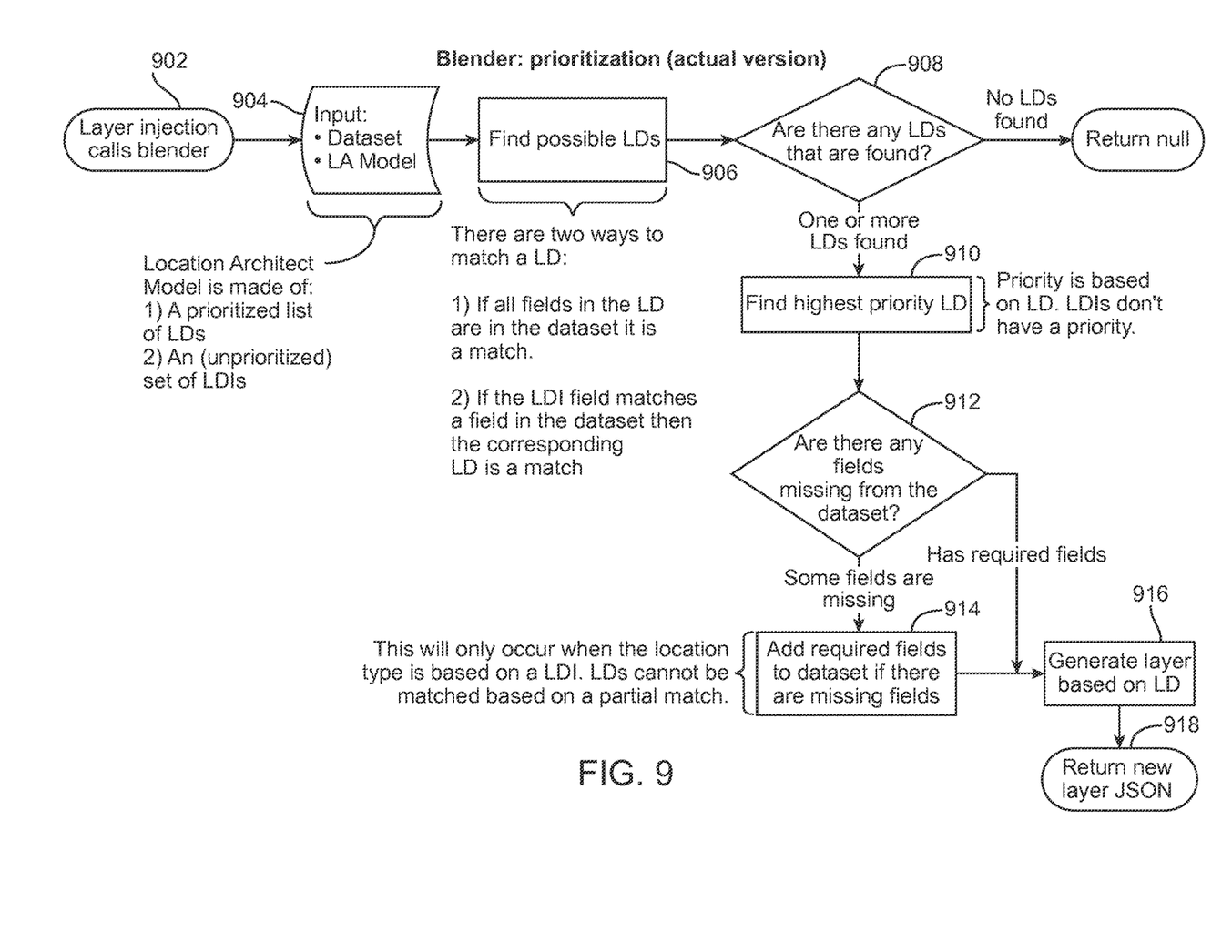
FIG. 9 is a diagram of a prioritization method according to a first embodiment of the present invention.

FIG. 9 is a diagram of a prioritization method according to a first embodiment of the present invention. A blender is used to blend the Location Definition(LD) used in the ArcGIS mapping software with the LDI (Location Definition Identifier) assigned to the business information by the configuration user. The BI location information is mapped to the location types, and a priority order is established. The Location Types in the embodiment of Location Architect are address, US city, world city, US Zip code, US county, US state, Country and Custom.

In a first step 902, the blender routine is called. It retrieves the inputs in step 904—the dataset and the GeoMeta Model. The GeoMeta Model is a prioritized list of Location Types and an unprioritized set of Location Definition Identifiers from the business model. In step 906, possible Location Types in the mapping program are found that match a Location Definition in the business model. If a match is found (step 908), the highest priority LT is used where there are multiple matches (step 910). The process is continued until all fields are examined (step 912). Fields are added as required (step 914) and the geo layer is added to the organization's business model as a map layer (step 916) in the form of a JavaScript Object Notation (JSON) file (step 918).

Figure 10:
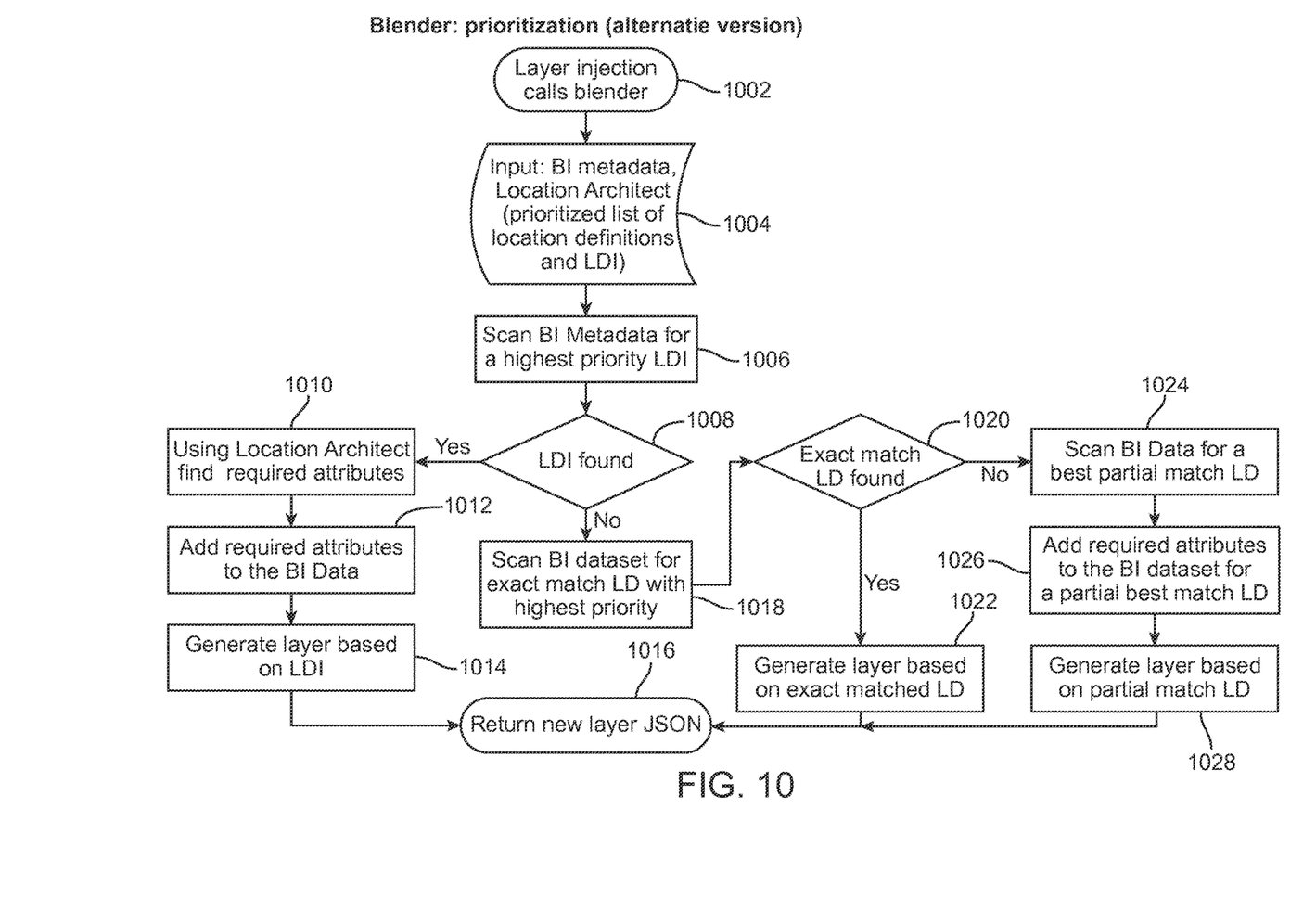
FIG. 10 is a diagram of a prioritization method according to a second embodiment of the present invention.

FIG. 10 is a diagram of a prioritization method according to a second embodiment of the present invention. In this embodiment, the prioritization is done at the same time as creating the Location Definitions, rather than later. In a first step 1002, the blender is called by layer injection (the program in charge of adding the business model layer to the map). It retrieves the inputs in step 1004—the dataset and the GeoMeta Model. The GeoMeta Model is a prioritized list of Location Types and an unprioritized set of Location Definition Identifiers from the business model. In step 1006, the BI metadata is scanned for the highest priority LDI. When it is found (1008), the required attributes are found using GEO meta data in the business information (1010). The required attributes are added to the BI data (1012), and a new layer is generated using the LDI (1014). The new layer is added to the organization's business model as a map layer in the form of a JavaScript Object Notation (JSON) file (step 1016).

If no highest priority LDI was found, the business information is scanned for an exact match to the Location Definition with the highest priority (1018). If an exact match is found (1020), the geo model layer is generated (1022). If no exact match is found, the BI data is scanned for a best partial match to the mapping program location definition (1024). E.g., zip code would be a partial match to US zip code. The required attributes are added to the BI data (1026), and a new layer is generated using the LDI (1028).

While the invention has been described with respect to specific embodiments, one of ordinary skill in the art will recognize that numerous modifications are possible. Thus, although the invention has been described with respect to specific embodiments, it will be appreciated that the invention is intended to cover all modifications and equivalents within the scope of the following claims.

The above disclosure provides examples and aspects relating to various embodiments within the scope of claims, appended hereto or later added in accordance with applicable law. However, these examples are not limiting as to how any disclosed aspect may be implemented.

All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, sixth paragraph. In particular, the use of "step of" in the claims herein is not intended to invoke the provisions of 35 U.S.C. § 112, sixth paragraph.

What is claimed is:

1. A method executed on a processor comprising:
   retrieving from a memory and presenting on a display, using the processor, a template identifying a plurality of style options for graphic representation of a selected type of business information;
   receiving, using the processor, configuration user input selecting one of the plurality of style types to provide a selected style type;
   storing, using the processor, the selected style type in memory associated with a configuration user organization and the selected type of business information;
   retrieving from a memory and presenting on a display, using the processor, a template identifying a plurality of location types used in a mapping program;
   receiving, using the processor, configuration user input identifying a business data field and a corresponding geographic information identifier from a business information program;
   in response to a configuration user selection, associating, using the processor, the geographic information identifier with a selected one of the location types used in the mapping program;
   storing in memory, using the processor, an association of the business data field with a selected one of the location types used in the mapping program;
   receiving, using the processor, at run-time of the mapping program, a business user input identifying the business data field and the type of business information; and
   retrieving from memory, using the processor, both the selected style type associated with the type of business information and the location definition associated with the business data field;
   rendering on a business user display, using the processor, the type of business information using the selected style type on the corresponding location identified by the location type.

2. The method of claim 1, wherein the processor and the memory comprise a plurality of different processors and memories.

3. The method of claim 1, further comprising a plurality of location types, each location definition associated with a prioritization value.

4. The method of claim 3 further comprising receiving a configuration user input specifying a priority order of prioritization values which determines, at runtime, which location definition will be rendered as a layer on a map when a business data field matches multiple location types in memory.

5. The method of claim 1 further comprising:
   storing, in a memory only accessible by users associated with the configuration user organization, the selected style type and the association of the business data field with a selected one of the location types used in the mapping program.

6. The method of claim 1 wherein the plurality of location types include address, US city, world city, US zip code, US county, US state, country and custom.

7. The method of claim 6, further comprising rendering the location types address, US city and world city as points and rendering the location types states, county, US zip code and country as polygons.

8. The method of claim 1 wherein the business data field comprises one of customer and store.

9. A method executed on a processor comprising:
   retrieving from a memory and presenting on a display, using the processor, a template identifying a plurality of style options for graphic representation of a selected type of business information;
   receiving, using the processor, configuration user input selecting one of the plurality of style types to provide a selected style type, wherein the selected style type is one of a color, point, line, area, polygon, bubble, graph, symbol and size;
   storing, using the processor, the selected style type in memory associated with a configuration user organization and the selected type of business information;
   retrieving from a memory and presenting on a display, using the processor, a template identifying a plurality of location types used in a mapping program;
   receiving, using the processor, configuration user input identifying a business data field and a corresponding geographic information identifier from a business information program;
   in response to a configuration user selection, associating, using the processor, the geographic information identifier with a selected one of the location types used in the mapping program;
   storing in memory, using the processor, an association of the business data field with a selected one of the location types used in the mapping program;
   receiving, using the processor, at run-time of the mapping program, a business user input identifying the business data field and the type of business information; and
   retrieving from memory, using the processor, both the selected style type associated with the type of business information and the location definition associated with the business data field;
   rendering on a business user display, using the processor, the type of business information using the selected style type on the corresponding location identified by the location type;
   wherein each of the plurality of location types is associated with a prioritization value and further comprising receiving a configuration user input specifying a priority order of prioritization values which determines, at runtime, which location definition will be rendered as a layer on a map when a business data field matches multiple location types in memory;
   wherein the plurality of location types include address, US city, world city, US zip code, US county, US state, country and custom; and
   rendering the location types address, US city and world city as points and rendering the location types states, county, US zip code and country as polygons.

10. A computer-program product tangibly embodied in a non-transitory computer-readable storage medium, including instructions configured to cause a data processing system to:
   retrieve from a memory and present on a display, using the processor, a template identifying a plurality of style options for graphic representation of a selected type of business information;
   receive, using the processor, configuration user input selecting one of the plurality of style types to provide a selected style type;
   store, using the processor, the selected style type in memory associated with a configuration user organization and the selected type of business information;

retrieve from a memory and presenting on a display, using the processor, a template identifying a plurality of location types used in a mapping program;

receive, using the processor, configuration user input identifying a business data field and a corresponding geographic information identifier from a business information program;

in response to a configuration user selection, associate, using the processor, the geographic information identifier with a selected one of the location types used in the mapping program;

store in memory, using the processor, an association of the business data field with a selected one of the location types used in the mapping program;

receive, using the processor, at run-time of the mapping program, a business user input identifying the business data field and the type of business information; and retrieve from memory, using the processor, both the selected style type associated with the type of business information and the location definition associated with the business data field;

render on a business user display, using the processor, the type of business information using the selected style type on the corresponding location identified by the location type.

11. The computer-program product of claim 10, wherein the processor and the memory comprise a plurality of different processors and memories.

12. The computer-program product of claim 10 wherein the business information field is a non-geographic field.

13. The computer-program product of claim 10, further comprising a plurality of location types, each location definition associated with a prioritization value.

14. The computer-program product of claim 13 further comprising receiving a configuration user input specifying a priority order of prioritization values which determines, at runtime, which location definition will be rendered as a layer on a map when a business data field matches multiple location types in memory.

15. The computer-program product of claim 10 further comprising:
storing, in a memory only accessible by users associated with the configuration user organization, the selected style type and the association of the business data field with a selected one of the location types used in the mapping program.

16. The computer-program product of claim 10 wherein the plurality of location types include address, US city, world city, US zip code, US county, US state, country and custom.

17. The computer-program product of claim 16, further comprising instructions configured to cause a data processing system to render the location types address, US city and world city as points and rendering the location types states, county, US zip code and country as polygons.

18. The computer-program product of claim 10 wherein the business data field comprises one of customer and store.

19. The method of claim 1, wherein the selected style type is one of a color, point, line, area, polygon, bubble, graph, symbol and size.

20. The computer program product of claim 1, further comprising instructions configured to cause a data processing system to provide a selected style type that is one of a color, point, line, area, polygon, bubble, graph, symbol and size.

* * * * *